United States Patent
Furst et al.

[15] 3,676,467
[45] July 11, 1972

[54] 15, 16 SUBSTITUTED STEROIDS AND DERIVATIVES

[72] Inventors: Andor Furst, Basel; Peter Muller, Arlesheim; Marcel Muller, Frenkendorf; Dieter Kagi, Basel, all of Switzerland

[73] Assignee: Hoffman-La Roche Inc., Nutley, N.J.

[22] Filed: April 17, 1969

[21] Appl. No.: 817,178

[30] Foreign Application Priority Data

April 22, 1968 Switzerland .......................... 5935/68

[52] U.S. Cl. .................... 260/397.3, 260/397.4, 260/397.47
[51] Int. Cl. ............................... C07c 169/32, C07c 169/34
[58] Field of Search .................................. 260/397.3, 397.4

[56] References Cited

UNITED STATES PATENTS 3,438,975  4/1969  Edwards ........................... 260/239.55

*Primary Examiner*—Elbert L. Roberts
*Attorney*—Samuel L. Welt, Jon S. Saxe, Bernard S. Leon, William H. Epstein, George M. Gould and Edward L. Mandell

[57] ABSTRACT

Compounds of the formula

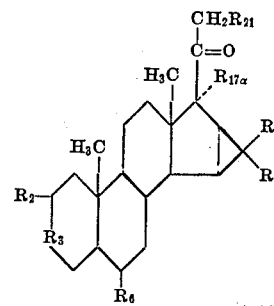

are described. The aforesaid compounds are useful as hormonal agents.

34 Claims, No Drawings

3,676,467

15, 16 SUBSTITUTED STEROIDS AND DERIVATIVES

BRIEF DESCRIPTION OF THE INVENTION

The present invention relates to steroid compounds of the formula

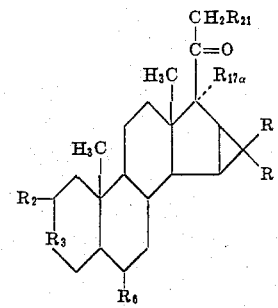

wherein $R_3$ is a 3-keto-$\Delta^{4,6}$, a 3-keto-$\Delta^{1,4}$, a 3-keto$\Delta^4$, a 3-keto-$\Delta^{1,4,6}$, a 3-acyloxy-$\Delta^{3,5}$, a 3-acyloxy-$\Delta^{2,4,6}$, a 3-acyloxy-$\Delta^{3,5,7}$, a 3-alkoxy-$\Delta^{3,5}$ or a 3-alkoxy-$\Delta^{3,5,7}$ system; $R_2$ is hydrogen or halogen; $R_6$ is hydrogen, halogen or lower alkyl; $R_{17\alpha}$ is a hydroxy, acyloxy or alkoxy group; $R_{21}$ is hydrogen, halogen, hydroxy, acyloxy or alkoxy and both residues R in each case is hydrogen or methyl.

As used herein the term "acyloxy group" shall mean a group which contains the residue of a saturated or unsaturated aliphatic, cycloaliphatic, araliphatic or aromatic carboxylic acid with up to 20 carbon atoms, preferably up to 12 carbon atoms. Examples of such acids include formic acid, acetic acid, pivalic acid, propionic acid, butyric acid, caproic acid, oenanthic acid, oleic acid, palmitic acid, stearic acid, succinic acid, malonic acid, citric acid or benzoic acid.

The term "alkoxy group" includes groups containing up to 10 carbon atoms which may be aliphatic, cycloaliphatic or araliphatic in nature. Examples of such alkoxy groups include methoxy, ethoxy, propoxy, butoxy and isomers such as tertiary butoxy, cyclopentyloxy, cyclohexyloxy and benzyloxy.

As used herein, the term "lower alkyl" comprehends a straight or branched chain hydrocarbon group containing from one to five carbon atoms. Examples of lower alkyl groups include methyl, ethyl, propyl, isopropyl, butyl and the like. The term "halogen" includes fluorine, chlorine, bromine, and iodine with fluorine, chlorine and bromine being the halogens of preference.

In one preferred aspect of the present invention compounds of formula I are defined wherein R is hydrogen, that is, compounds corresponding to the following formula

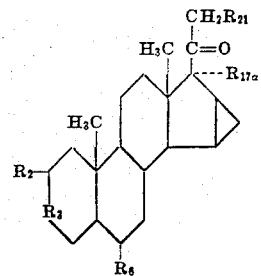

Ia wherein $R_2$, $R_3$, $R_6$, $R_{17\alpha}$, and $R_{21}$ are as above.

In another preferred aspect of the present invention, compounds of formula I are defined wherein R is methyl, that is compounds corresponding to the following formula

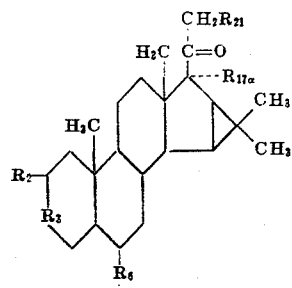

Ib where $R_2$, $R_3$, $R_6$, $R_{17}$ and $R_{21}$ are as above.

Particularly preferred groups of compounds are obtained when $R_3$ is a keto group in conjunction with a $\Delta^4$, $\Delta^{1,4}$, $\Delta^{4,6}$ or $\Delta^{1,4,6}$ system and $R_2$ and $R_{21}$ are hydrogen, that is compounds of the following formulas

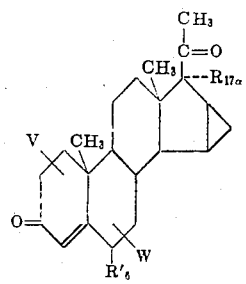

Ic and

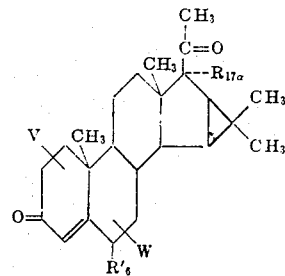

Id where $R_{17\alpha}$ is as above; V is a saturated or unsaturated bond between the 1 and 2 positions; W is a saturated or unsaturated bond between the 6 and 7 positions and $R_6'$ is hydrogen or halogen.

The compounds of formula I may be prepared by the selection of an appropriate process from the following processes:

A. Oxidation to the hydroxy ketone grouping of a 17(20) double bond of a steroid of the formula

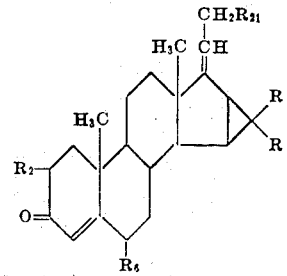

II where R, $R_2$, $R_6$ and $R_{21}$ are as above;

B. Halogenation in the 2-position of a compound of the following formula

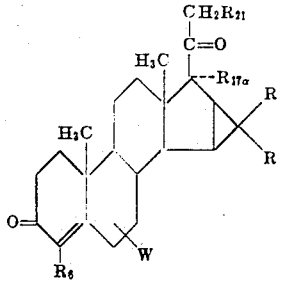

III where R, $R_6$, $R_{17\alpha}$, $R_{21}$ and W are as above;

C. Halogenating in the 6-position a steroid of the formula

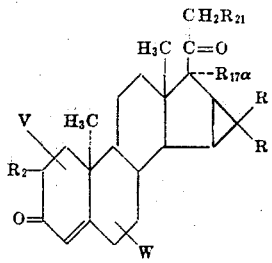

(IV)

where R, $R_2$, $R_{17\alpha}$, $R_{21}$, V and W are as above;

C. Alkylating in the 6-position a steroid of formula IV above;

E. Hydroxylating in a manner known per se in the 21-position a steroid of the formula

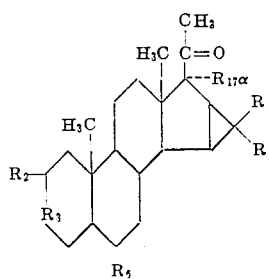

V where R, $R_2$, $R_3$, $R_6$ and $R_{17\alpha}$ are as above;

F. Dehydrogenating in the 1-and/or 6-position a steroid of the formula

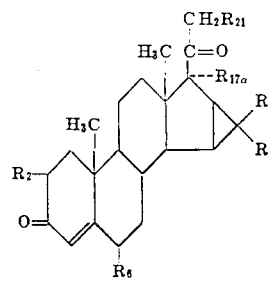

VI where R, $R_2$, $R_6$, $R_{17\alpha}$ and $R_{21}$ are as above;

G. Enol-esterifying or enol-etherifying a steroid of the formula

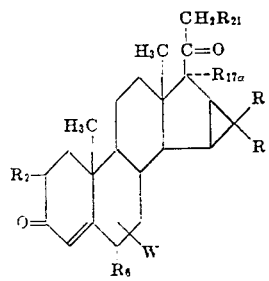

VII where R, $R_2$, $R_6$, $R_{17\alpha}$, $R_{21}$ and W are as above;

H. Acylating or alkylating a steroid of formula I wherein at least one substituent group $R_{21}$ or $R_{17\alpha}$ is a hydroxy group; or, I. Hydroxylating in the 17α-position a steroid of the formula

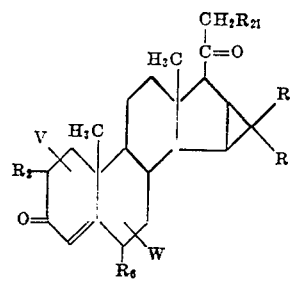

VIII wherein R, $R_2$, $R_6$, $R_{21}$, V and W are as above; or

K. isomerizing the 6-methylene group in a steroid of formula

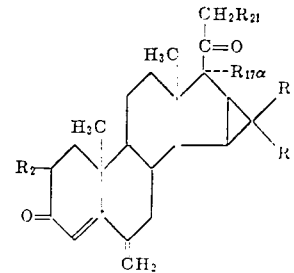

IX wherein R, $R_2$, $R_{17\alpha}$ and $R_{21}$ are as above, to form a 6-methyl group.

The oxidation of the 17(20) double bond to the hydroxyketone grouping (procedure A) can, for example, be carried out using oxidizing agents such as a tertiary amine N-oxide peroxide in tert.-butanol/pyridine in the presence of catalytic amounts of osmium tetroxide. Examples of tertiary amine N-oxide peroxides include for example, N-methyl-morpholine N-oxide peroxide or triethylamine oxide peroxide. On the other hand, with oxidizing agents such as osmium tetroxide or permanganates one can oxidize to the 17,20-glycol and further oxidize the latter to the hydroxyketone with oxidizing agents such as chromic acid.

The halogenation of the steroid of formula III or its 6(7)-dehydro derivative in the 2-position (procedure B) can be accomplished, for example, as follows:

With a reducing agent such as lithium aluminum hydride, the starting steroid of formula III or its 6(7)-dehydro-derivative is reduced to the corresponding 3,20-diol. The 3,20-diol can be partially oxidized (e.g., by means of manganese dioxide) to the 3-keto-20-ol-steroid. This compound is converted into the 2-oxalyl or 2-hydroxymethylene compound by reaction with an oxalic acid or formic acid ester (e.g., the ethyl ester) and then treated with halogenating agents such as perchloryl fluoride, N-bromo- or N-chlorosuccinimide or elementary chlorine, bromine or iodine and a base such as an alkali alcoholate. Oxidation of the 20-hydroxy group with oxidizing agents such as chromic acid finally yields the 2-halo derivative of a compound of formula III or of its 6(7)-dehydro derivative.

The halogenation of a steroid of formula IV or of its 6(7)-dehydro derivative in the 6-position (procedure C) can be effected by reaction with a halogenating agent such as an N-haloimide (e.g., N-bromosuccinimide) or with a halogen (e.g., with elementary bromine). [See J. Am. Chem. Soc. 72, 4534 (1950)]6-position can also be accomplished by converting a steroid of formula IV into a 3-enol ester or 3-enol ether (e.g., the 3-enol acetate) and thereafter reacting with chlorine or bromine [see J. Am. Chem. Soc. 82, 1230 (1960)]; with a N-haloimide [see J. Am. Chem. Soc. 82, 1230 (1960); 77, 3827 (1955)] or perchloryl fluoride [see J. Am. Chem. Soc. 81, 5259 (1959); Chem. and Ind. 1959, 1317].

A further procedure for halogenation in the 6-position comprises converting a 6(7)-dehydro or 1(2), 6(7)-bisdehydro derivative of a steroid of formula IV into the 6,7-oxide (which can, for example, be brought about by treatment with peracids such as perphthalic acid), treating the 6,7-oxide with hydrogen halide and splitting off water from the 7-hydroxy-6-halo-steroid thus obtained, with elimination of the 7-hydroxy group and introduction of a 6(7) double bond.

Insofar as isomer mixtures (i.e., mixtures of 6α- and 6β-halo-steroids) are formed in the halogenations described hereinbefore, these can be separated into the pure isomers according to known methods such as chromatography.

For the alkylation of a steroid of formula IV (procedure D), one can proceed as follows: A steroid of formula IV is treated with a ketalizing agent such as a glycol, preferably ethylene glycol, in the presence of a catalyst such as p-toluenesulfonic acid. On treatment with a peracid such as perphthalic acid, the ketalized steroid yields a 5,6-oxido-steroid. Reaction of this 5,6-oxido-steroid with an alkyl Grignard compound, the alkyl group of which corresponds to the alkyl group which is to be introduced into the 6-position, and subsequent treatment with acid yields, with dehydration and ketal-cleavage, a 6-alkyl derivative of the starting steroid of formula IV.

The hydroxylation of a steroid of formula V in the 21-position (procedure E) can, for example, be effected by preparing the 21-diiodide by treatment with iodine and a base such as calcium oxide in methanol, and reacting this with potassium acetate in glacial acetic. The 21-acetoxy compound thus obtained can then be saponified (e.g. with aqueous-methanolic potassium carbonate solution).

The introduction of a $\Delta^6$ double bond into a steroid of formula VI (procedure F) can, for example, be effected in the 6,7-position with a substituted benzoquinone such as chloranil [see J. Am. Chem. Soc. 82, 4293 (1960); 81, 5951 (1959)] or with 2,3-dichloro-5,6-dicyanobenzoquinone or with manganese dioxide [see J. Am. Chem. Soc. 75, 5932 (1953)]. The introduction of a $\Delta^1$ double bond into a steroid of formula VI can, for example, be brought about in the 1,2-position in a microbiological manner or with dehydrogenating agents such as iodine pentoxide, periodic acid or selenium dioxide [see J. Am. Soc. 81, 1235; 5951 (1959)], with 2,3-dichloro-5,6-dicyanobenzoquinone [see Proc. Chem. Soc. 1960, 14] with lead tetraacetate [see J. Am. Chem. Soc. 77, 661 (1955)] or with chloranil [see J. Am. Chem. Soc. 82, 4293 (1960)]. With 2,3-dichloro-5,6-dicyanobenzoquinone or chloranil, the 1,4,6-trisdehydro compound can be obtained directly from a steroid of formula VI.

The enol-etherification of steroids of formula VII or their 6(7)-dehydro derivatives (procedure G) for the purpose of introducing the 3-alkoxy-$\Delta^{3,5}$ or the 3-alkoxy-$\Delta^{3,5,7}$ system can, for example, be undertaken by reaction with an alcohol (e.g., methanol, ethanol, benzyl alcohol) in the presence of a catalyst (e.g., p-toluenesulfonic acid) or with an orthoformic acid ester in the presence of a catalyst (e.g. with orthoformic acid ethyl ester and hydrochloric acid) or with a dialkoxypropane (e.g., 2,2-dimethoxypropane) in methanol-dimethylformamide in the presence of a catalyst (such as p-toluenesulfonic acid).

The enol-esterification of 3-keto-$\Delta^4$-steroids of formula VII or their 6-dehydro derivatives to 3-acyloxy-$\Delta^{3,5}$- or -3-acyloxy-$\Delta^{2,4,6}$-steroids can be accomplished by treatment with an acylating agent such as isopropenyl acetate in the presence of a catalyst such as p-toluenesulfonic acid. 3-Acyloxy-$\Delta^{3,5,7}$-steroids of formula I can be obtained by treatment of 6-dehydro derivatives of 3-keto-$\Delta^4$-steroids of formula VII with an acylating agent such as acetyl chloride/acetic anhydride, optionally in the presence of a strong acid such as perchloric acid.

The acylation or alkylation of free hydroxy groups in the 17α- or 21-position of a steroid of formula I (procedure H) can be effected in a manner known per se by treatment with an acylating agent such as an acyl chloride (e.g., acetyl chloride) or by treatment with an alkyl halide such as methyl or ethyl iodide or an alkyl sulfate such as dimethyl sulfate in the presence of an acid-binding agent such as pyridine.

The 17α-hydroxylation of a steroid of formula VIII (procedure I) can be carried out as follows:

In a suitable solvent such as dioxane or tert. butanol, a steroid of formula VIII is treated with oxygen in the presence of potassium tert.-butylate a 17α-hydroperoxide being obtained. The 3- and 20-keto groups are thereafter protected (e.g., by ketalization) and the 17α-hydroperoxide group is reduced to the hydroxy group e.g., with a reducing agent such as zinc).

The isomerization of the 6-methylene group of a steroid of formula IX (procedure K) can be effected by treatment of the starting steroid with a catalyst, e.g., a hydrogenation catalyst such as palladium. Conveniently, a hydrogen donator, such as cyclohexene, is added as an activator for the catalyst. Undesired side-reactions such as hydrogenation caused by the hydrogen donator can be suppressed by buffering the reaction mixture.

The starting compounds of formula II can be prepared as follows;

A 3β-hydroxy-androsta-5,15-dien-17-one is converted into the 3β-acetate by acetylation (e.g., with pyridine/acetic anhydride). A methylene or isopropylidene group is then added at the 15, 16 double bond of a 3β-acetoxy-androsta-5,15-dien-17-one thus obtained. This can be brought about by treating the steroid with dimethylsulfoxonium methylide or, for the purpose of adding the isopropylidene group, with diphenylsulfonium isopropylide [see J. Am. Chem. Soc. 89, 3912 (1967)]. Re-acetylation with pyridine/acetic anhydride gives a 3β-acetoxy-15,16-methylene (or isopropylidene)-androst-5-en-17-one which is converted according to Wittig with an ethylidene phosphorane into a 3β-acetoxy-15,16-methylene (or isopropylidene)-pregna-5,17(20) diene. Alkaline hydrolysis and Oppenauer oxidation of such a compound yields a 15,16-methylene (or isopropylidene)-pregna-4,17-dien-3-one of formula II. Insofar as they are not already present, halogen or alkyl substituents can be inserted into a starting compound of formula II thus obtained in the positions 2 or 6, for which the methods described above in relation to the halogenation or alkylation of steroids of formulas III and IV can be used. Compounds of formula II with halogen substituents are preferably manufactured in this manner.

Compounds of formula IX can be prepared by reacting a steroid of formula I wherein $R_6$ is hydrogen and $R_3$ is a 3-3-methoxy-$\Delta^{3,5}$-system in a manner known per se to form a corresponding 6-formyl derivative, reducing the formyl group, e.g. by means of sodium borohydride, to form a hydroxymethyl group and finally dehydrating the reaction product with concomitant cleavage of the enol ether group.

The compounds of formula I possess hormonal (e.g., progestative) activity and influence the gonadotropin economy. They can be used as medicaments (e.g., for the treatment of menstruation anomalies and for fertility control). As a dosage guideline, a daily dosage of 1–10 mg. may be employed for a mature subject. It should be noted that higher or lower dosages can be used depending on the individual needs and the professional judgment of the person administering or supervising the administration of the subject compounds.

The compounds of this invention can be used in the form of pharmaceutical preparations which contain them in admixture with a pharmaceutical organic or inorganic inert carrier material which is suitable for enteral, percutaneous or parenteral application — such as, for example, water, gelatin, gum arabic, lactose, starches, magnesium stearate, talc, vegetable oils, polyalkyleneglycols, Vaseline, etc. The pharmaceutical preparations can be submitted in solid form (e.g., as tablets, dragées, suppositories, capsules), in semi-solid form (e.g., as ointments) or in liquid form (e.g., as solutions, suspensions, or emulsions). The may be sterilized and/or contain additives such as preserving, stabilizing, wetting or emulsifying agents, salts for varying the osmotic pressure or buffers. They can also contain yet other therapeutically valuable substances.

The following examples are illustrative but not limatative of this invention. All temperatures are stated in degrees Centigrade.

EXAMPLE 1

A total of 95 ml. of a 0.65 molar solution of N-methylmorpholine oxide peroxide were added dropwise within 10 minutes at room temperature to a well stirred mixture of 7.0 g. of 15β, 16β- methylene-pregna-4,17(20)-dien-3-one, 70 ml. of methylene chloride, 160 ml. of abs. tert. butanol, 12 ml. of pyridine and 225 mg. of osmium tetroxide. The mixture was stirred at room temperature for 3 hours, subsequently treated with 2.3 g. of sodium sulfite and again stirred for 30 minutes. For the working up, the reaction mixture was poured onto ice-water and extracted with methylene chloride. The organic extracts were washed with water and dried with sodium sulfate. The crude product obtained after evaporation of the solvent was chromatographed on 400 g. of silica gel. The hexane-ether (2:1) eluates yielded 4.3 g. of pure 17β-hydroxy-15 β16β-methylene-pregn-4-ene-3,20-dione, melting point 190–191°(from acetone-hexane). $[\alpha]_D^{25°} = ++100°$ ($c = 0.1$ in dioxane). UV spectrum: $\epsilon_{241} = 1\,17,200$. The ether eluates gave 1.2 g. of pure 17α, 20-dihydroxy-15β,16β-methylene-pregn-4-en-3-one, melting point 192–196° (from acetone-hexane). $\epsilon_{241} = 16,700$. $[\alpha]_D^{25°} = +37°$ ($c = 0.1$ in dioxane). 15β,16β4,17(20)-dien-3-one can be prepared as follows:

A total of 2.83 g. of a 50 percent suspension of sodium hydride in mineral oil was added to a solution of 12.3 g. of trimethylsulfoxonium iodide in 250 ml. of dimethyl sulfoxide. The mixture was stirred under argon for 10 minutes, then treated within 15 minutes with a solution of 17.5 g. of 3β-acetoxy-androsta-5,15-dien-17-one (prepared by acetylation of 3-hydroxy-androsta-5,15-dien-17-one)in 400 ml. of dimethylsulfoxide and subsequently stirred at room temperature for 4 hours. For the working up, the mixture was poured onto ice-water, acidified with acetic acid and extracted with methylene chloride. The organic extracts were washed neutral with water, dried with sodium sulfate and the solvent evaporated in vacuum. The residue was treated for 2 hours at room temperature with 250 ml. of pyridine and 250 ml. of acetic anhydride, thereafter evaporated to dryness in vacuum and chromatographed on 200 g. of aluminum oxide (Act. II). The benzene eluates yielded 16.0 g. of thin-layer chromatographically pure 3β-acetoxy-15β,16β-methylene-androst-5-en-17-one which melted at 142–143° after crystallization from acetone-hexane. $[\alpha]_D^{25°} = -98°$ ($c = 0.1$ in dioxane).

To a solution of 15.2 g. of 3β-acetoxy-15β,16β-methylene-androst-5-en-17-one in 260 ml. of dimethyl sulfoxide there were added 82.4 g. of triphenylethylphosphonium bromide and thereafter, with stirring and argon-gassing withing 15 minutes, a solution of 24.8 g. of potassium tert. butylate in 400 ml. of dimethyl sulfoxide. The phosphonium salt went into solution with red coloration and slight increase in temperature. The reaction mixture was stirred at room temperature for 2 hours and then at 60° for a further 3 hours. For the working up, the mixture was poured onto ice-common salt solution and extracted with ether. The ether extracts were washed neutral with water, dried with sodium sulfate and evaporated to dryness in vacuum. The residue was dissolved in 150 ml. of pyridine and, after the addition of 150 ml. of acetic anhydride, allowed to stand at room temperature for 3 hours. The mixture was thereafter evaporated to dryness in vacuum. The residue, which contains major amounts of triphenylphosphine oxide was dissolved in hexane-acetone (8:1) and the solution was filtered through 800 g. of silica gel. The filtrate yielded 14.8 g. of pure 3β-acetoxy-15β,16β-methylene-pregna-5,17(20)-diene, melting point 145–146° (from ethanol). $[\alpha]_D^{25°} = -94°$ ($c = 0.1$ in dioxane).

A mixture of 12.5 g. of 3β-acetoxy-15β,16β-methylene-pregna-5,17(20)-diene, 100 ml. of methanol, 500 ml. of methanol and 12.5 g. of potassium carbonate was stirred at room temperature under argon-gassing for 3 hours, thereafter poured onto ice-water and extracted with methylene chloride. The organic extracts were washed with water, dried with sodium sulfate and the solvent evaporated in vacuum. A total of 10.0 g. of pure 3β-hydroxy-15β,16β-methylene-pregna-5,17(20)-diene, melting point 180–182° (from acetone), was obtained $[\alpha]_D^{25°} = -95°$ ($c = 0.1$ dioxane).

A total of 10.0 g. of 3β-hydroxy-15β,16β-methylene-pregna-5,17(20)-diene was dissolved in 1,400 ml. of toluene and 1,000 ml. of cyclohexanone. Toluene (200 ml.) was first of all distilled off from this solution. A total of 50.0 g. of aluminum tert-butylate was subsequently added and the mixture heated under reflux at 140° with argon-gassing for 2 ½ hours. For the working up, the mixture was poured onto ice-water and extracted with methylene chloride. The organic extracts were washed with water, dried with sodium sulfate and the solvent evaporated in vacuum. The residue was subjected to a steam-distillation for 1 hour. The distillation residue was extracted with ether The ethereal extracts yielded 9.5 g. of crystalline material which, crystallized from acetone-hexane, yielded 7.5 g. of pure 15β,16β-methylene-pregna-4,17(20)-dien-3-one. Melting point 180°–181°. $[\alpha]_D^{25°} = +92°$ ($c = 0.1$ in dioxane).

EXAMPLE 2

A total of 6 ml. of a 0.65-molar solution of N-methylmorpholine oxide peroxide was added dropwise at room temperature within 10 minutes to a well stirred mixture of 500 mg. of 21-acetoxy-15β,16β-methylenepregna-4,17(20)-dien-3-one, 5 ml. of methylene chloride, 10 ml. of abs. tert. butanol, 0.75 ml. of pyridine and 14 mg. of osmium tetroxide. The mixture was stirred at room temperature for 3 hours, 150 mg. of sodium sulfite were subsequently added and the mixture was again stirred for 30 minutes. The reaction mixture was poured onto ice-water and extracted with methylene chloride. The extracts were washed with water, dried over sodium sulfate and evaporated. Chromatography of the crude product thus obtained on a 100-fold amount of Kieselgel with hexane/ether 1:1 gave pure 21-acetoxy-17α-hydroxy-15β,16β-methylenepregn-4-ene-3,20-dione.

21-Acetoxy-15β,16β-methylene-pregna-4,17(20)-dien-3-one can be prepared as follows:

A total of 2 g. of 15β,16β-methyleneandrost-4-ene-3,17-dione was dissolved in 10 ml. of dimethylformamide and, after the addition of 10 ml. of 2,2-dimethoxy-propane, 50 mg. of p-toluene-sulfonic acid and 0.4 ml. of methanol, boiled at reflux under argon for 3 hours. After cooling, the solution was treated with 300 mg. of sodium bicarbonate, allowed to stand for 10 minutes and then poured onto water. The mixture was extracted with ether which contained a few drops of pyridine, the extracts were washed with water, dried over sodium sulfate and the solvent evaporated. Crystallization from a little abs. alcohol which contained 1 percent pyridine gave pure 3-methoxy-15β,16β-methyl-eneandrosta-3,5-dien-17-one.

A total of 1.2 g. (25 mmol) of a 50 per cent sodium hydride suspension in mineral oil was washed free of oil with n-hexane. The sodium hydride was thereafter suspended in 60 ml. of 1,2-dimethoxyethane and treated dropwise under an argon atmosphere with stirring with 5.6 g. (25 mmol) of triethylphosphonoacetate. After standing for an hour at room temperature, a solution of 1.56 g. (5 mmol) of 3-methoxy-15β,16β-methyleneandrosta-3,5-dien-17-one in 10 ml. of 1,2-dimethoxyethane was added dropwise. The mixture was stirred at room temperature for 30 boiled at reflux for 1 hour, the cooled solution was poured onto ice-water and the product extracted with ether. The extracts were washed with water, dried over sodium sulfate and evaporated. The crude 3-methoxy-15β,16β-methylenepregna-3,5,16(20)-triene 21-carboxylic acid ethyl ester thus obtained was employed in the next reaction without further purification.

A total of 1.6 g. of crude 3-methoxy-15β,16β-methylenepregna-3,5,17(20)-triene 21-carboxylic acid ethyl ester was dissolved in 100 ml. of abs. ether and added dropwise under argon to a stirred suspension of 2 g. of lithium aluminum hydride in 50 ml. of ether. The mixture was firstly stirred at room temperature for 30 minutes, the at reflux for 2 hours, and the reaction mixture cooled to 0° was then decomposed by dropwise addition of water. The organic phase was decanted and the paste-like residue triturated several times with methylene chloride and water. The combined liquid phases were washed neutral with saturated common salt solution, dried over sodium sulfate and evaporated. The crude 21-hydroxy-3-methoxy-15β,16β-methylenepregna-3,5,17(20)-triene was employed in the next step without purification.

A total of 1.2 g. of crude 21-hydroxy-3-methoxy-15β,16β-methylene-pregna-3,5,17(20)-triene was dissolved in 20 ml. of dioxane and, after the addition of 1 ml. of concentrated hydrochloric acid and 1 ml. of water, stirred under argon at room temperature for 2 hours. The reaction mixture was then poured onto a large amount of water, extracted with ether/methylene chloride (3:1), the extracts washed with saturated bicarbonate solution and saturated common salt solution, dried over sodium sulfate and the solvent evaporated. The crude product was chromatographed on a 100-fold amount of Kieselgel. Pure 21-hydroxy-15β,16β-methylenepregna-4,17(20)-dien-3-one was isolated with hexane/acetone (5:1).

A total of 500 mg. of 21-hydroxy-15β,16β-methylenepregna-4,17(20)-dien-3-one was treated with 5 ml. of pyridine and 5 ml. of acetic anhydride and allowed to stand overnight. The excess acetic anhydride was decomposed by the addition of methanol and the reaction mixture evaporated in vacuum. Crystallization from acetone/hexane gave pure 21-acetoxy-15β,16β-methylenepregna-4,17(20)-dien-3-one.

EXAMPLE 3

A total of 4.05 g. of 17α-hydroxy-15β,16β-methylene-pregn-4-ene-3,20-dione and 0.40 g. of p-toluenesulfonic acid were dissolved in 160 ml. of benzene. Benzene (25 ml.) was distilled off from the reaction mixture. A mixture of 40 ml. of isopropenyl acetate and 80 ml. of benzene was then added during 12 hours while 120 ml. of benzene was simultaneously distilled off via a Vigreux column. The cooled reaction solution was treated with benzene, washed with cold sodium bicarbonate solution and water and dried with sodium sulfate. After evaporation of the solvent in vacuum, the crude product was dissolved in benzene-ether (95:5) and filtered through 90 g. of silica gel. The eluate yielded 4.8 g. of pure 3,17α-diacetoxy-15β,16β-methylene-pregna-3,5-dien-20-one which melted at 159°–162° after recrystallization from methanol. $\epsilon_{235} = 15,100$ $[\alpha]_D^{25°} = -118°$ ($c = 0.1$ in dioxane).

EXAMPLE 4

A solution of 0.85 g. of chlorine gas in 30 ml. of glacial acetic was added within 5 minutes to a cooled (−5°), well stirred mixture of 4.70 g. of 3,17α-diacetoxy-15β,16β-methylene-pregna-3,5-dien-20-one, 8.8 g. of potassium acetate, 200 ml. of ether, 85 ml. of glacial acetic and 15 ml. of water. The mixture was subsequently stirred at −5° for a further 10 minutes, then poured onto ice-water and extracted with ether. The ether extracts were washed neutral with water, dried with sodium sulfate and evaporated to dryness. The residue was chromatographed on silica gel. With hexane-ether (2:1) there was firstly eluted 17α-acetoxy-2β-chloro-15β,16β-methylene-pregna-4-ene-3,20-dione which was recrystallized from acetone-hexane. Melting point 225°–226°. $\epsilon_{246.5} = 16,000$. $[\alpha]_D^{25°} = -129°$.

The following hexane-ether 2:1 eluates yielded pure 17α-acetoxy-6β-chloro-15β,16β-methylene-pregn-4-ene-3,20-dione. Melting point 154°–155° (from ether-isopropyl ether). $\epsilon_{240} = 15,600$ $[\alpha]_D^{25°} = -92°$ ($c = 0.1$ in dioxane).

EXAMPLE 5

A solution of 1.35 g. of 17α-acetoxy-6β-chloro-15β,16β-methylene-pregna-4,6-diene-3,20-dione, 65 mg. of p-toluenesulfonic acid and 1.2 ml. of orthoformic acid ethyl ester in 30 ml. of dioxane was allowed to stand in the dark for 16 hours and then was added within 10 minutes to a well stirred mixture of 7.0 g. of manganese dioxide, 60 ml. of glacial acetic and 5 ml. of water. The mixture was stirred for a further 2 hours, poured onto ice-water and extracted with methylene chloride. The organic extracts were washed with sodium carbonate solution and water, dried with sodium sulfate and evaporated. The residue was chromatographed on silica gel. The thin-layer chromatographically uniform fractions eluted with hexane-ether (2:1) were combined and yielded, when recrystallized from ether, pure 17α-acetoxy-6-chloro-15β,16β-methylene-pregna-4,6-diene-3,20-dione of melting point 235°–237°. $\epsilon_{284} = 22,700$ $[\alpha]_D^{25°} = -102°$ ($c = 0.1$ in dioxane).

EXAMPLE 6

A solution of 1 g. of calcium chloride in 10 ml. of abs. methanol was added to a mixture of 10.0 g. of 17α-hydroxy-15β,16β-methylene-pregn-4-ene-3,20-dione and 50 ml. of abs. methanol. After the addition of 6.0 g. of calcium oxide (dried at 600°), a solution of 14.8 g. of iodine in 55 ml. of abs. methanol which contained 6 per cent calcium chloride was added dropwise with stirring and nitrogen-gassing at 25°–27° in the dark in such a way that the temperature did not exceed 28° C and the iodine was continuously consumed. After completed addition, the mixture was stirred at room temperature for a further 5 minutes and then cooled to −10°. The precipitate which separated out was filtered off by suction, washed with a little cold (−20°) methanol and then sucked dry. This material was introduced with stirring into a mixture of 180 ml. of ice-water and 15 ml. of glacial acetic and stirred at 0° for 30 minutes. It was again filtered off by suction, washed free from iodine with water and dried at 25° in vacuum. There was obtained 17.5 g. of crude diiodide which was heated to reflux under argon-gassing for 2 hours with 160 ml. of acetone, 1.5 ml. of water, 1.5 ml. of glacial acetic and 16 g. of potassium acetate. The cooled reaction solution was poured onto ice-water. The 21-acetoxy-17α-hydroxy-15β,16β-methylene-pregn-4-ene-3,20-dione was filtered off by suction, washed with water, dried in vacuum at 25°, and finally dissolved in 170 ml. of methanol. The solution was treated with a solution of 2.0 g. of potassium carbonate in 35 ml. of water and, while passing nitrogen through, stirred at room temperature for 1 ½ hours. A total of 4 ml. of glacial acetic and 10 ml. of water were then added and the whole mixture poured onto saturated common salt solution. The mixture was extracted with methylene chloride, the extract washed with water and dried with sodium sulfate. After evaporation of the solvent, there was obtained 9.0 g. of crystals which were chromatographed on silica gel. Pure 17α,21-dihydroxy-15β,16β-methylene-pregn-4-ene-3,20-dione was eluted with methylene chlorine-acetone (10:1). UV: $\epsilon_{239} = 16,800$. Melting point 196°–198°; $[\alpha]_D^{25°} = +91°$.

EXAMPLE 7

A solution of 5.25 g. of 3,17α-diacetoxy-15β,16β-methylene-pregna-3,5-diene in 160 ml of acetic acid and 40 ml 2N hydrochloric acid, was maintained at room temperature for 5 hours. The product was worked up by pouring into ice-water, extracting with ether, washing the ethereal extract with sodium carbonate solution and water, drying over sodium sulphate and evaporating. The residue was recrystallized from acetone-isopropylether. The 17α-acetoxy-15β,16β-methylene-pregna-4-ene-3,20-dione melted at 244°–247° C $\epsilon_{238.5} = 17,800$; $[\alpha]_D^{25°} = -14°$ ($c=0.1$ in dioxan).

EXAMPLE 8

20 g of 17α-acetoxy-15β,16β-methylene-pregna-4-ene-3,20-dione, 1.3 ml of dimethylformamide, 1.2 ml of 2,2 dimethoxypropane, 36 mg of p-toluenesulphonic acid and 0.36 ml of methanol were refluxed under argon for two hours. The product was worked up by pouring the reaction mixture into 100 ml of ice-cold sodium carbonate solution and extracting with ether-methylene chloride. The organic extracts were washed with water, dried with sodium sulphate and evaporated. The residue was recrystallized from methylene chloride-isopropylether. The product was pure 17α-acetoxy-3-methoxy-15β,16β-methylene-pregna-3,5-diene-20-one having a melting point of 252°–253° C. $\epsilon_{239} = 21,000$ $[\alpha]_D^{25°} = -205°$ ($c=0.1$ in dioxane).

EXAMPLE 9

A solution of 2.34 g of 2,3-dichloro-5,6-dicyanobenzoquinone in 100 ml of dioxane, which contained 6.5 percent HCl, was added dropwise over 3 minutes to a solution of 3.3 g of 17α-acetoxy-15β,16β-methylene-pregna-4-ene-3.20-dione in 100 ml of dioxane which contained 6.5 percent HCl. The reaction mixture was stirred for 1 minutes, poured into ice-water and extracted with ether-methylene chloride. The organic extracts were extracted three times with dilute-sodium hydroxide, washed with water, dried with sodium sulphate and evaporated. The residue was chromatographed on silica gel using ether-hexane as the solvent. The fractions which were

11 uniform according to thin layer chromatography were collected and recrystallized from acetone-hexane. The product was pure 17α-acetoxy-15β,16β-methylene-pregna-4,6-diene-3,20-dione having a melting point of 225°–226° C. $\epsilon_{283}=27,000$ $[\alpha]_D^{25°}=-86°$ ($c=0.1$ in dioxane).

EXAMPLE 10

10 ml of ethanol containing 0.5 percent cyclohexane was added dropwise over 5 hours to a stirred, refluxing, mixture of 0.5 g of 17α-acetoxy-6;15β,16β-dimethylene-pregna-4-ene-3,20-dione, 250 mg of sodium acetate, 25 mg of 5 percent palladium on carbon and 15 ml of ethanol. The reaction mixture was then filtered and the filtrate was evaporated. The resulting product was chromatographed on 75 g of silica gel. Elution with hexane-ether provided pure 17α-acetoxy-6-methyl-15β,16β4,6-diene-3,20-dione. After recrystallization from acetone-hexane the product had a melting point of 191°–192° C. $\epsilon_{289}=23,500$, $[\alpha]_D^{25°}=-78°$ ($c=0.1$ in dioxane).

EXAMPLE 11

A freshly prepared solution of 2.0 g of phosgene in 30 ml of ethylene chloride was added over 30 minutes to a stirred, cooled (0° C) mixture of 9.0 g dimethylformamide and 10 ml of ethylene chloride. 10 minutes later a solution of 6.0 g of 17α-acetoxy-3-methoxy-15β,16β-methylene-pregna-3,5-diene-20-one in 50 ml of ethylene dichloride which also contained 0.5 ml of pyridine was added. Stirring was continued for a further 2 hours at 10°–15° C. The product was worked up by adding 4 ml of saturated sodium acetate solution, stirring intensively for 10 minutes, pouring into water and extracting with ether. The etheral extract was washed several times with water, dried with sodium sulphate and evaporated under a vacuum. The resulting crude 6-formyl-3-enol ether was dissolved in 80 ml of methanol. 0.8 g of sodium borohydride was then added and the mixture was stirred for 15 minutes at room temperature. The reaction mixture was then poured into ice-water and extracted with methylene chloride and evaporated. The resulting crude 6-hydroxymethyl-3-enolether was dissolved in 70 ml of 80 percent acetic acid and treated at 100° C for 20 minutes. The product was worked up by pouring into ice-water and extracting with methylene-chloride-petroleum ether. The organic extracts were washed with sodium carbonate solution and ice-water, dried with sodium sulphate and evaporated. The fractions which were uniform according to thin layer chromatography were collected and, after recrystallization from acetone-hexane, gave pure 17α-acetoxy-6; 15β,16β-bismethylene-pregna-4-ene-3,20-dione. Melting point 199°–201° C; $\epsilon_{260}=12,100$ $[\alpha]_D^{25°}=100°$ ($c=0.1$ in dioxane).

EXAMPLE 12

A solution of 17,21-dihydroxy-15β,16β-methylene-pregna-4-ene-3,20-dione in 10 ml of pyridine and 10 ml of acetic anhydride was kept at room temperature for 30 minutes. The reaction mixture was worked up to yield 550 mg of 21-acetoxy-17α-hydroxy-15β,16β-methylene-pregna-4-ene-3,20-dione which was dissolved in a mixture of 15 ml acetic acid, 4 ml of acetic anhydride and 550 mg of p-toluenesulfonic acid. The resulting mixture was kept at room temperature for 2 hours, poured into ice water and extracted with methylene chloride. The organic extract afforded 660 mg of crude product which was chromatographed on silica gel. Using methylene chloride/acetone as the elution agent there was obtained 200 mg of pure 3,17α,21-triacetoxy-15β,16β-methylene-pregna-3,5-dien-20-one of melting point 197°–200° (from acetone/hexane). $\epsilon_{234}=19,550$, $[\alpha]_D^{25°}=-205°$. Further elution gave pure 17α,21-diacetoxy- 15β,16β-methylene-pregn-4-ene-3,20-dione of melting point 203°–206° (from acetone/hexane). $\epsilon_{239}=16,900$, $[\alpha]_D^{25°}=-10°$.

EXAMPLE 13

Tablets suitable for oral administration were prepared according to the following recipe.

| | | |
|---|---|---|
| 17α-acetoxy-6-chloro-15β,16β-methylene-pregna-4,6-diene-3,20-dione | | 3 mg |
| Lactose | | 60 mg |
| Talc | | 1.8 mg |
| Magnesium stearate | Total | 100.0 mg |

We claim:
1. Compounds of the formula

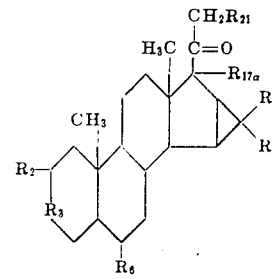

I wherein $R_3$ is a 3-keto-$\Delta^{4,6}$, a 3-keto-$\Delta^{1,4}$, a 3-keto-$\Delta^4$, a 3-keto-$\Delta^{1,4,6}$, a 3-acyloxy-$\Delta^{3,5}$, a 3-acyloxy-$\Delta^{2,4,6}$, a 3-acyloxy-$\Delta^{3,5,7}$, a 3-alkoxy-$\Delta^{3,5}$ or a 3-alkoxy-$\Delta^{3,5,7}$ system; $R_2$ is hydrogen or halogen; $R_6$ is hydrogen, halogen, or lower alkyl; $R_{17\alpha}$ is a hydroxy, acyloxy, or alkoxy group; $R_{21}$ is hydrogen, halogen, hydroxy, acyloxy or alkoxy with the proviso that $R_{21}$ is hydrogen when either $R_2$ or $R_6$ is other than hydrogen; and both residues R in each case is hydrogen or methyl.

2. The compounds of claim 1 wherein R is hydrogen, that is, compounds of the formula

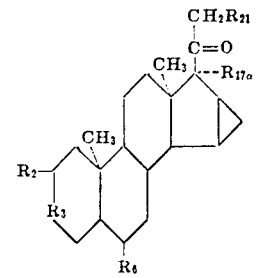

Ia where $R_2$, $R_3$, $R_6$, $R_{17\alpha}$ and $R_{21}$ are as in claim 1.

3. The compounds of claim 2 wherein $R_2$ is hydrogen, $R_3$ is a 3-keto-$\Delta^{4a}$, $\Delta^{1,4}$, $\Delta^{4,6}$ or $\Delta^{1,4,6}$ system and $R_{21}$ is hydrogen, that is, compounds of the formula

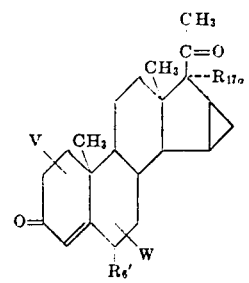

Ic where $R_{17\alpha}$ is as in claim 1, $R_6'$ is hydrogen or halogen, V is a saturated or unsaturated bond between the 1 and 2 positions and W is a saturated or unsaturated bond between the 6 and 7 positions.

4. The compounds of claim 1 wherein R is methyl, that is, compounds of the formula

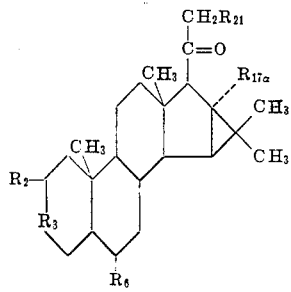

where $R_2$, $R_3$, $R_6$, $R_{17\alpha}$ and $R_{21}$ are as in claim 1.

5. The compounds of claim 2 wherein $R_2$ and $R_6$ are hydrogen and $R_{21}$ is acyloxy.

6. The compound of claim 5 wherein $R_3$ is a 3-keto $\Delta^4$ system; $R_{17\alpha}$ is hydroxy and $R_{21}$ is acetoxy, that is, 21-acetoxy-17α-hydroxy-15β,16β-methylene-pregna-4-ene-3,20-dione.

7. The compound of claim 5 wherein $R_3$ is a 3-keto-$\Delta^4$-system and $R_{17\alpha}$ and $R_{21}$ are acetoxy; that is, 17α,21-diacetoxy-15β,16β-methylene-pregna-4-ene-3,20-dione.

8. The compounds of claim 2 wherein $R_2$ and $R_6$ are hydrogen and $R_{21}$ is hydroxy.

9. The compound of claim 8 wherein $R_3$ is a 3-keto$\Delta^4$-system, and $R_{17\alpha}$ is hydroxy, that is, 17α,21-dihydroxy-15β,16β-methylene-pregna-4-ene-3,20-dione.

10. The compounds of claim 2 wherein $R_2$, $R_6$ and $R_{21}$ are hydrogen and $R_3$ is a 3-acyloxy-$\Delta^{3,5}$-system and $R_{17\alpha}$ is acyloxy.

11. The compounds of claim 2 wherein $R_2$ and $R_6$ are hydrogen, $R_3$ is a 3-acyloxy-$\Delta^{3,5}$-system and $R_{17\alpha}$ and $R_{21}$ are acyloxy.

12. The compound of claim 10 wherein $R_3$ is a 3-acetoxy-$\Delta^{3,5}$-system and $R_{17\alpha}$ is acetoxy, that is, 3,17α-diacetoxy-15β,16β-methylene-pregna-3,5-dien-20-one.

13. The compound of claim 11 wherein $R_3$ is a 3-acetoxy-$\Delta^{3,5}$-system and $R_{17\alpha}$ and $R_{21}$ are acetoxy, that is, 3,17α,21-triacetoxy-15β,16β-methylene-pregna-3,5-dien-20-one.

14. The compounds of claim 2 wherein $R_2$ is halogen.

15. The compound of claim 14 wherein $R_2$ is chloro, $R_3$ is a 3-keto-$\Delta^4$-system, $R_6$ is hydrogen, $R_{17\alpha}$ is acetoxy and $R_{21}$ is hydrogen, that is, 17α-acetoxy-2β-chloro-15β,16β-methylene-pregna-4-ene-3,20-dione.

16. The compounds of claim 4 wherein $R_2$ is hydrogen, $R_3$ is a 3-keto-$\Delta^4$, $\Delta^{1,4}$, $\Delta^{4,6}$ or $\Delta^{1,4,6}$ system and $R_{21}$ is hydrogen, that is, compounds of the formula

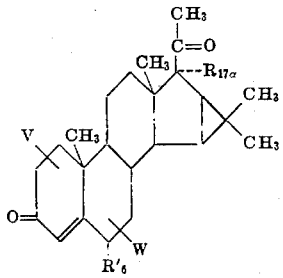

where R is as in claim 1, $R_6'$ is hydrogen or halogen, V is a saturated or unsaturated bond between the 1 and 2 positions and W is a saturated or unsaturated bond between the 6 and 7 positions.

17. The compounds of claim 3 wherein $R_{17\alpha}$ is hydroxy.

18. The compound of claim 17 wherein $R_6'$ is hydrogen, and V and W are saturated bonds, that is, 17α-hydroxy-15β,16β-methylene-pregna-4-ene-3,20-dione.

19. The compounds of claim 3 wherein $R_{17\alpha}$ is acyloxy.

20. The compound of claim 19 wherein $R_6'$ is chloro, $R_{17\alpha}$ is acetoxy and V and W are saturated bonds, that is, 17α-acetoxy 6β-chloro-15β,16β-methylene-pregna-4-ene-3,20-dione.

21. The compound of claim 19 wherein $R_6'$ is chloro, $R_{17\alpha}$ is acetoxy, V is a saturated bond and W is an unsaturated bond, that is, 17α-acetoxy-6-chloro-15β,16β-methylene-pregna-4,6-diene-3,20-dione.

22. The compound of claim 19 wherein $R_6'$ is hydrogen, $R_{17\alpha}$ is acetoxy and V and W are saturated bonds, that is, 17α-acetoxy-15β,16β-methylene-pregna-4-ene-3,20-dione.

23. The compound of claim 19 wherein $R_6'$ is hydrogen, $R_{17\alpha}$ is acetoxy, V is a saturated bond and W is an unsaturated bond, that is, 17α-acetoxy-15β,16β-methylene-pregna-4,6-diene-3,20-dione.

24. The compounds of claim 2 wherein $R_2$ is hydrogen, $R_3$ is a 3-keto-$\Delta^4$, $\Delta^{1,4}$, $\Delta^{4,6}$ or $\Delta^{1,4,6}$-system, $R_6$ is lower alkyl, $R_{17\alpha}$ is acyloxy and $R_{21}$ is hydrogen.

25. The compound of claim 24 wherein $R_3$ is a 3-keto$\Delta^{4,6}$-system, $R_6$ is methyl and $R_{17\alpha}$ is acetoxy, that is 17α-acetoxy-6-methyl-15β,16β-methylene-pregna-4,6-diene-3,20-dione.

26. The compounds of claim 2 wherein $R_2$, $R_6$ and $R_{21}$ are hydrogen and $R_3$ is a 3-alkoxy-$\Delta^{3,5}$-system.

27. The compound of claim 26 wherein $R_3$ is a 3-methoxy-$\Delta^{3,5}$-system, that is, 17α-acetoxy-3-methoxy-15β,16β-methylene-pregna-3,5-dien-20-one.

28. Compounds of the formula

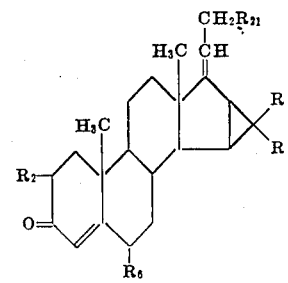

where R is hydrogen or methyl; $R_2$ is hydrogen or halogen, $R_6$ is hydrogen, halogen or lower alkyl and $R_{21}$ is hydrogen, halogen, hydroxy, acyloxy or alkoxy with the proviso that $R_{21}$ is hydrogen when either $R_2$ or $R_6$ is other than hydrogen.

29. The compounds of claim 28 wherein R is hydrogen.

30. The compound of claim 29 wherein $R_2$, $R_6$ and $R_{21}$ are hydrogen, that is, 15β,16β-methylene-pregna-4,17(20)-dien-3-one.

31. The compound of claim 29 wherein $R_2$ and $R_6$ are hydrogen and $R_{21}$ is acetoxy, that is, 21-acetoxy-15β,16β-methylene-pregna-4,17(20)-dien-3-one.

32. Compounds of the formula

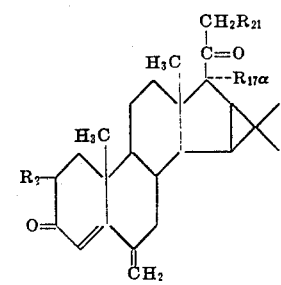

where R is hydrogen or methyl, $R_2$ is hydrogen or halogen, $R_{17\alpha}$ is a hydroxy, acyloxy or alkoxy group and $R_{21}$ is hydrogen, halogen, hydroxy, acyloxy or alkoxy with the proviso that $R_{21}$ is hydrogen when $R_2$ is other than hydrogen.

33. The compounds of claim 32 wherein R, $R_2$ and $R_{21}$ are hydrogen and $R_{17\alpha}$ is acyloxy.

34. The compound of claim 33, wherein $R_{17\alpha}$ is acetoxy, that is, 17α-acetoxy-6;15β,16β-bismethylene-pregna-4-ene-3,20-dione.

* * * * *

UNITED STATES PATENT OFFICE
CERTIFICATE OF CORRECTION

Patent No. 3,676,467            Dated            July 11, 1972

Inventor(s)   Andor Furst, Peter Muller, Marcel Muller & Dieter Kagi

It is certified that error appears in the above-identified patent and that said Letters Patent are hereby corrected as shown below:

Column 12, line 55, claim 3: "3 keto $\triangle^{bq?}$" should be 3 keto $\triangle^4$ Column 13, line 18, claim 6:   "pregna" should be pregn Column 13, line 21, claim 7:   "pregna" should be pregn Column 13, line 26, claim 9:   "pregna" should be pregn Column 13, line 43, claim 15:   "pregna" should be pregn Column 13, line 66, claim 18:   "pregna" should be pregn Column 13, line 70, claim 20:   "pregna" should be pregn Column 14, line 2, claim 21:   "pregna" should be pregn Column 14, line 6, claim 22:   "pregna" should be pregn Column 14, line 69, claim 34:   "pregna" should be pregn Signed and sealed this 3rd day of July 1973.

(SEAL)
Attest:

EDWARD M. FLETCHER, JR.          Rene Tegtmeyer
Attesting Officer               Acting Commissioner of Patents